United States Patent [19]
Hawie

[11] Patent Number: 4,530,617
[45] Date of Patent: Jul. 23, 1985

[54] ASSEMBLY HAVING ADJUSTABLE TENSION FASTENER MEANS

[75] Inventor: Robert L. Hawie, Stratford, Conn.

[73] Assignee: The Hawie Mfg. Co., Bridgeport, Conn.

[21] Appl. No.: 421,032

[22] Filed: Sep. 22, 1982

[51] Int. Cl.³ .............................................. F16B 2/02
[52] U.S. Cl. .................................. 403/290; 403/373; 403/361; 16/114 R
[58] Field of Search ............... 403/361, 373, 290, 322, 403/354, 309, 313, 312, 287, 301; 279/82, 96, 45, 42, 78, 76; 16/114 R

[56] References Cited

U.S. PATENT DOCUMENTS

| | | | |
|---|---|---|---|
| 200,203 | 2/1878 | Knox | 403/290 X |
| 1,404,562 | 1/1922 | Anderson | 279/76 |
| 1,714,361 | 5/1929 | Gougler | 279/76 X |
| 1,715,097 | 5/1929 | Redinger | 279/42 |
| 2,470,179 | 5/1949 | McCloskey | 403/370 |
| 3,502,351 | 3/1970 | Gray | 403/373 X |
| 3,724,367 | 4/1973 | Pasinski | 403/373 X |
| 3,830,135 | 8/1974 | Sullivan | 279/76 X |

*Primary Examiner*—Andrew V. Kundrat
*Attorney, Agent, or Firm*—Thomas L. Tully

[57] ABSTRACT

Assembly comprising a handle element such as a pole having frictionally-secured to one end thereof an attachment such as a tool element adapted to be separated therefrom under the effects of a predetermined, variable axial pulling force. The invention comprises an adjustable tension fastener means having one part fixed to the handle element and another part fixed to the tool element, said one part being frictionally-engaged by said other part by an adjustable tension means which permits the degree of the frictional engagement to be adjusted to correspond to the amount of the pulling force at which it is desired that the pole and the attachment should separate.

10 Claims, 5 Drawing Figures

ASSEMBLY HAVING ADJUSTABLE TENSION FASTENER MEANS

BACKGROUND OF THE INVENTION

The present invention relates to an assembly of a pole element or handle and an end attachment or tool fixture which is frictionally-engaged by the end of the pole or handle. More particularly, the invention relates to hand tools such as gaffs, spears, harpoons, boat hooks, or other similar marine tools, animal snares or other handheld assemblies which conventionally include apole element such as a handle and an end attachment element such as a tool which is designed for engagement with an object such as an animal or thing.

The invention is particularly concerned with improved flying gaffs comprising a pole element and a gaffing hook which is releasably attached to the pole and which is connected to a line. In use, the gaffing hook is either connected to the pole by a weak attachment means or is held over the end of the pole by the line which is held by the user. The object is to retain the gaffing hook on the end of the pole so that the hook can be extended in to the water into position beneath a large fish to be gaffed. At this point the pole and/or the hand-held line is yanked in to cause the hook to penetrate the skin of the fish and snare the fish on the gaff. This causes the gaff to become detached from the pole so that the fish is now held by the line, the end of which is generally secured to the boat to permit the the end of which is generally secured to the boat to permit the user to release his grip on the line if the fish is too large to be controlled by a hand-held line.

An important problem encountered with conventional flying gaffs is the difficulty of sinking the gaff hook into fish of different sizes and types. The toughness of the skin of a fish varies greatly with the type of the fish and its size. Some fish, such as sharks, have tough skin which is difficult to pierce. If the yanking force applied by the user causes the gaffing tool to separate from the pole before the gaffing hook can penetrate the skin of the fish, the fish is not snared and can escape. Conversely, if the gaffing tool cannot be separated from the pole, when or after the fish is secured on the gaffing hook, the pole will be pulled into the water if the user is unable to control the fish on the end of the pole.

Another important problem encountered with other types of conventional pole element assemblies designed for manual use such as boat hooks, animal snares, etc., relates to the danger of personal injury and/or loss of the assembly due to the inability of the user to overcome the pulling force of the object which is engaged by the attachment element on the pole element, i.e., a calf, a boat, etc. In an effort to control the object, the user can incur physical injury or be pulled into the ocean or lose grip on the pole assembly whereby the assembly can be lost together with control of the object.

Some of these problems can be avoided by releasably securing the attachment element to the pole element so that the attachment element separates from the pole element under the effects of an axial pulling force, and by having a line tied to the attachment element so that the attachment element, and the object engaged thereby, can be retrieved. The main disadvantage of such releasable securement is that it is not adjustable. In the case of a flying gaff, securement which might be strong enough to enable the gaff hook to be sunk into fish of one type or size may not be strong enough in the case of fish having tougher skins. In the case of other assemblies, such as boat hooks, animal snares, etc., it is desirable that the tool attachment should remain attached to the pole so that the user can control the object, such as a boat or a calf, with the assembly. An unduly weak releasable securement between the tool and the pole converts the pole element from being a control device to being a mere extension element which permits the attachment to be secured to the object. Control is lost when the pole element and attachment element become separated and control is regained when the pole is dropped and the line is taken in hand. This is an improvement over personal injury and/or loss of the assembly and total loss of control of the object. However, it is unsatisfactory in practice because the primary purpose of some hand-held pole assemblies, such as boat hooks and animal snares, is to enable the user to take quick and release-resistant control so as to permit a boat to be pulled close to a dock without any loss of control, even though temporary, since such loss of control results in delay and inconvenience.

While the functional operation of certain pole assemblies differs, i.e., the tool element and the pole of a flying gaff are intended to separate during normal use while the tool element and the pole of a boat hook are not intended to separate during normal use, the desirability of controlling the strength of attachment between the tool and the pole to prevent separation under the effects of certain axial pulling forces and to permit separation under the effects of greater axial pulling forces is common to these different types of pole assemblies.

SUMMARY OF THE INVENTION

The present invention relates to a novel assembly of an elongate pole element and an end attachment element or tool which is releasably-secured to the pole element by an adjustable tension means which permits the user to adjust the degree of securement between the pole element and the attachment element to satisfy the requirements of the use of the particular assembly, whereby predetermined pulling forces will permit the assembly to remain intact or unitary while greater pulling forces will cause the attachment element to separate from the pole element. In nearly all cases, such as where the assembly comprises a flying gaff, a boat hook, etc., a line must be secured to the attachment element in order to retain control of the attachment element after it becomes separated from the pole element.

THE DRAWING

Figure 1:
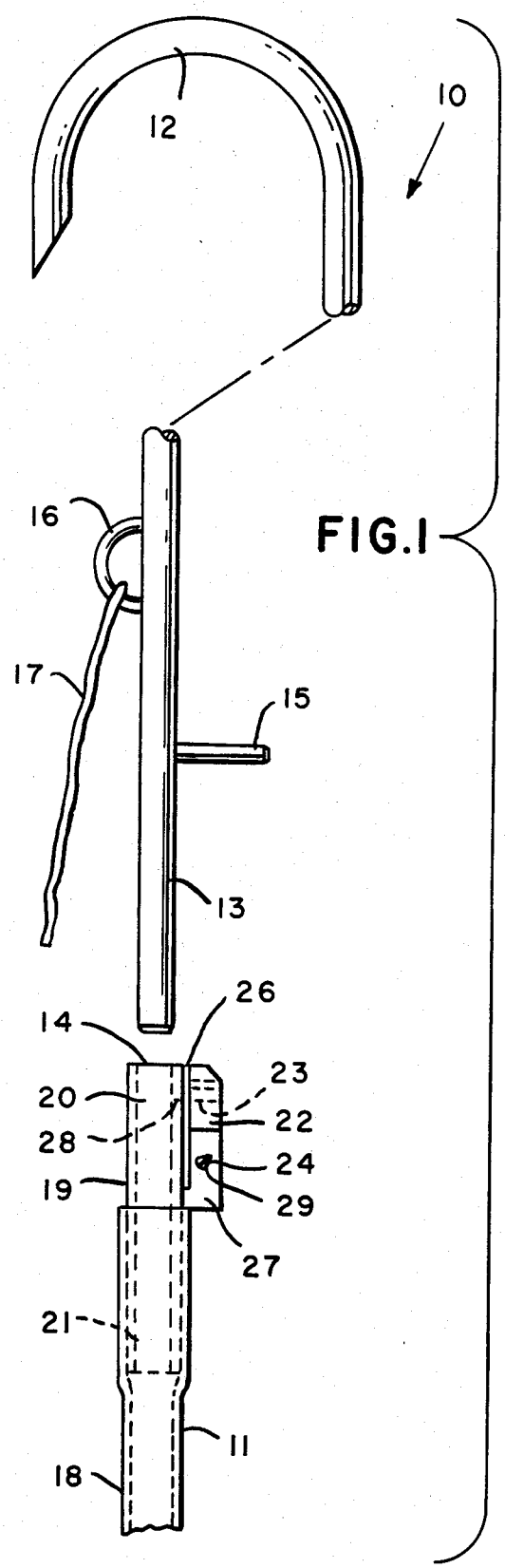
FIG. 1 is a segmented plan view of a gaff assembly according to one embodiment of the present invention, the pole or handle and the end attachment or gaffing tool being illustrated in separated or disassembled relation.

In the embodiment of FIG. 1 the assembly 10 comprises a pole element 11 and an attachment element 12 comprising a gaff tool or sharp hook. The attachment element 12 comprises a metal tool having a cylindrical shank 13 which is frictionally-engageable within a central cylindrical receiving bore 14 in the pole element 11. The attachment element 12 also comprises an integral engagement member such as a pin 15 which projects outwardly from the shank 13 at a location spaced from the end of the shank 13. The attachment element 12 also comprises an integral line-attachment means such as a closed eyelet or loop 16 to which a strong flexible line 17, such as a rope, is secured.

Figures 2, 3:
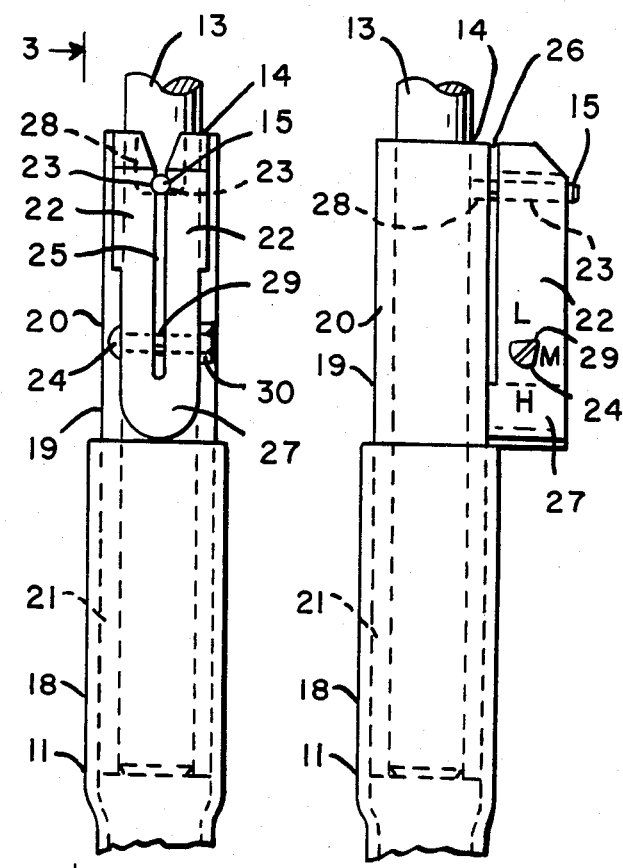
FIG. 2 is a magnified sectional side view of the assembly of FIG. 1 in assembled or engaged relation.
FIG. 3 is a magnified view taken along the line 3—3 of FIG. 2 illustrating the presence of indicia on the tension-adjustment means.

The pole element 11 preferably comprises a hollow tubular sleeve 18 of aluminum or stainless steel having an inner diameter which is larger than the outer diameter of the cylindrical shank 13 of the attachment element 11 so as to receive the shank 13 therewithin. The pole element 11 also comprises an integral retainer means 19 which is fixed to pole element 11, adjacent the end thereof. In the embodiment of FIGS. 1 to 3, the retainer member 19, shown as an individual element in FIG. 3 in relation to the tubular pole 18 which is shown by means of broken lines, comprises a strong rigid plastic element having a projecting fastener section 20, a cylindrical stem section 21 and a uniform cylindrical bore 14 having an inner diameter which is slightly larger than the outer diameter of the cylindrical shank 13 of the attachment element 12 so as to receive said shank 13 in snug frictional engagement therewithin. The stem section 21 is received within and secured to the tubular sleeve 18 such as by means of an adhesive to prevent separation. In the embodiment illustrated the tubular sleeve 18 is swaged to form an enlarged receiving opening for the stem 21 of the retainer member 19.

The most critical elements of the retainer member 19 comprise the flexible plastic fingers 22, the companion retainer grooves 23 therein and the adjustable compression member 24 which joins the fingers 22 with a variable compressive force. As shown most clearly by FIGS. 2 and 3, the fingers 22 are integral with the main body of the retainer member 19 and with each other, being molded or machined so as to be separated from each other, along the maximum portion of the length of each, by a radial slot 25 which is open at the top of the member 19 and which preferably is enlarged at the top to facilitate introduction of the attachment pin 15 within the slot 25 when the attachment element 12 is introduced to the pole element 11 during assembly. The fingers 22 are also spaced from the main body of the retainer member 19, along the maximum portion of the length of each, by a transverse axial slot 26 so that the fingers 22 are only integral with each other and with the main body of the retainer member 19 at a lower portion 27 below both of said slots 25 and 26. Thus the flexible plastic fingers 22 extend upwardly, parallel to each other and to the bore 14 of the retainer member 19, and the latter is provided with a recess 28, shown by means of broken lines in FIGS. 2 and 3, so that the attachment pin 15 can be received into the recess 28 and between the fingers 22 until it snaps into seated position in the companion radial retainer grooves 23 formed in the opposing surfaces of the fingers 22.

The adjustable compression member 24 comprises a bolt 29 which passes through a hole in one finger, in a location between area 27 and groove 23, and threadably engages the other finger or a nut 30 fixed to said other finger so that when said bolt 29 is tightened, the fingers 22 are drawn together to narrow the slot 25 and the space between the opposed retainer grooves 23 and reduce the flexibility of the fingers.

Preferably, the outer surface of finger 22, which is engaged by the head of bolt 29, is provided with indicia such as "L", "M" and "H" which, in correlation with the direction-indicating shape of the head of bolt 29, permits a low, medium or high degree of compression to be pre-adjusted by the user. In the "L" or low position the fingers 22 may be restrained in normal spaced relation so that the attachment element 12 and its retainer pin 15 may be snapped out of engagement from between fingers 22 and grooves 23 with a predetermined degree of axial pulling force. In the "M" or medium position the fingers 22 are drawn together to reduce the width of slot 25 in the area of grooves 23 so as to increase the compressive force exerted by the grooves 23 upon the retainer pin 15 therewithin so that a greater axial pulling force is required to pull the pin 15 out of grooves 23. If the bolt 29 is turned to the "H" or high position, the fingers 22 are drawn closer together to close the slot 25 in the area of the grooves 23 so as to maximize the compressive force exerted by the grooves 23 upon the pin 15 contained therewithin so that a maximum axial pulling force is required to pull the pin 15 out of the grooves 23.

As a variation of the structure illustrated by FIGS. 1 to 3, either one of the fingers 22 but preferably the rear finger to which the nut 30 is attached in FIG. 2, may be rigid and integral with the section 20 along its entire length, i.e., the slot 26 may be present in only one of the fingers 22, most preferably the front finger 22 seen in FIG. 3, so that only one of the fingers is flexible and is moved by the adjustment bolt 29 to vary the engagement tension as desired.

The retainer member 19 preferably is molded from a self-lubricating plastic, such as Delrin (registered trademark for polyvinyl acetal) but other plastics, such as nylon, or metals may also be used.

It will be clear to those skilled in the art that the diameter of the retainer pin 15, the width of the slot 25, the depth of the grooves 23 and the length and flexibility of the finger(s) 22 can be varied to provide various predetermined axial pulling force requirements, depending upon the end use to which the assembly is to be put.

It will also be clear that the retainer pin 15 can be present on the pole element 11 and the retainer means 19 can be present on the attachment element 12, although such a reversal is less preferred since the attachment element should be as simple as possible.

The line-attachment means on the attachment element 12, such as metal loop 16 shown in FIG. 1, preferably should be located on the same side of the element 12 as the functional portion thereof, i.e., the hook shown in FIG. 1, so that any pulling action on the line 17 will assist the performance of such function.

Figures 4, 5:
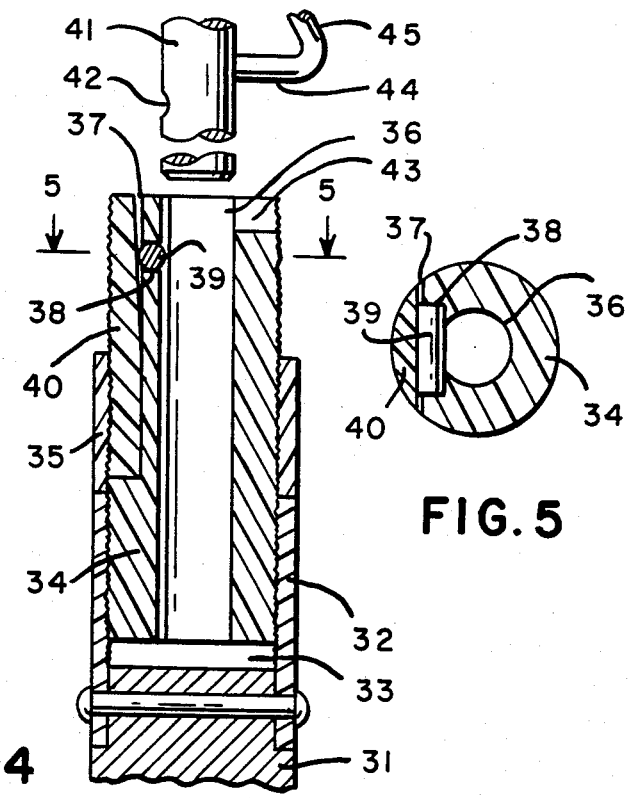
FIG. 4 is a cross-sectional view of a gaff assembly according to another embodiment of the present invention.
FIG. 5 is a view taken along the line 5—5 of FIG. 4.

The embodiment of FIGS. 4 and 5 provides an internal, concealed retainer means and a simplified tool structure and, therefore, is a preferred embodiment.

The assembly of FIGS. 4 and 5 comprises an elongate handle or pole 31 having a cylindrical sleeve 32 attached to and extending beyond the end thereof to provide an inner threaded bore 33 which threadably engages a threaded retainer element 34 carrying a threaded collar 35.

The collar 35 can be screwed to any desired location along the length of the retainer element 34 and the latter can be screwed into the sleeve 32 until the bottom of the collar 35 engages the top shoulder of the sleeve 32. Such engagement locks the retainer element 34 in place.

The retainer element 34 comprises a cylindrical body, preferably formed of a plastic, such as Delrin, having a central shank-receiving bore 36, a slot 37 which is tangential to said bore 36, and a transverse recess 38 into which is inserted a bearing 39.

The slot 37 extends along a substantial portion of the length of the retainer element 34 to form a flexible finger 40 which can be flexed towards or away from the main body to open or close the width of the slot 37. This permits the formation of the recess 38 and the insertion of the bearing 39 which preferably is a smooth cylindrical metal bearing which can revolve within its recess 38. The recess 38 opens between the bore 36 and the slot 37 so that the bearing 39 extends into the bore 36 and engages the interior surface of the finger 40.

The shank 41 of a tool to be attached, such as a gaff, is provided with a transverse surface notch 42 and has an outer diameter slightly smaller than the inner diameter of the bore 36 to permit the shank to be slipped snugly into the bore 36 until the bottom of the shank 41 engages the portion of the bearing 39 which extends into the bore. The application of slight downward force against the shank 41 causes the bearing 39 to be pushed out of the bore 36 against the finger 40 which flexes outwardly under the pressure. When the notch 42 comes into position opposite the bearing 39, the latter snaps into the notch 42 to provide a locking engagement between the retainer element 34 and the shank 41. The strength of such locking engagement depends upon the ability of the finger 40 to flex, and the novel structure of the assembly of FIGS. 4 and 5 enables the control of such flexing ability.

The movement of the collar 35 in the direction of the bearing 39 reduces the length of the finger 40 which extends beyond the collar 35 and thereby reduces the ability of the finger 40 to flex and increases the tension between the bearing 39 and the shank 41 at notch 42. If the collar 35 is screwed to the top of the retainer element 34 so as to encircle the area of the bearing 39, no flexing of the finger 40 is possible and a positive locking engagement is obtained. As the collar 35 is screwed down the element 34 to expose larger portions of the finger 40 below the area of the bearing 39, greater flexibility is permitted in the finger 40 and the tension of the engagement between the shank 41 and the retainer element 34 is gradually reduced to any predetermined desired degree. As noted, when the collar 35 is positioned on the retainer element 34, as desired, the latter is tightened into the sleeve 32 until the collar makes locking engagement with the sleeve.

The outer surface of the retainer element 34 may be provided with indicia and the collar 35 may be provided with an arrow or other index to enable the user to position these two elements precisely, relative to each other, to provide any desired tensional engagement with an inserted tool, such as a gaff. This permits the user to pre-set the degree of engagement between the gaff and the pole so as to be great enough to permit the gaff to pierce the skin of the particular fish to be gaffed and yet not so great as to prevent the gaff from separating from the retainer element on the pole when piercing is accomplished.

While the present drawings illustrate the use of cylindrical tool shanks and bores, it will be clear to those skilled in the art that shanks of any desired cross-section may be used and that the receiving bore of the retainer element should have a companion cross-section.

Similarly, the present retainer element 20 of FIGS. 1 to 3 and the present sleeve 32 of FIG. 4 may be formed as elements adapted to be attached and detached from an elongate handle or pole or may be formed as fixed elements of an elongate handle or pole. The retainer element 34 of FIG. 4 preferably is also provided with a radial shoulder recess 43 or slot which is open to receive the radial pin portion 44 of a closed eyelet or loop 45 present on the shank 41 of the attachment element, in cases where the attachment element is a gaff having a line attached to the eyelet or loop 45. The engagement of pin section 44 within recess 43 assures alignment between the bearing 39 and the notch 42 on shank 41 and prevents rotation of the shank 41 of the attachment element within the bore 36 of the retainer element 34. Such alignment is less critical in cases where the notch 42 on the shank 41 is a continuous notch which extends around the entire periphery of the shank 41. However, it is preferable in the case of most attachment elements, such as gaffs, to secure the attachment element against rotation within its bore. This result can also be obtained through the use of shanks and bores which are not round in cross-section.

The retainer element 34 of FIG. 4 is a two-piece element in which the finger 40 is separate from the main body and is held in place thereagainst by means of the adjustable collar 35. Such structure facilitates the formation of the interior bearing recess 38 and the insertion of the bearing 39 therein. However, in view of the flexibility of the finger 40, it is possible to form the finger 40 as an integral part of the retainer element 34 and to flex the finger back to form the recess 38 and to insert bearing 39. It is also possible to form a radial bore through the finger 40 and retainer element 34 and to attach a round-headed pin to the finger 40 for extension through the retainer element 34 for engagement with the notch 42 of shank 41.

It will also be clear to those skilled in the art that the adjustable compression member 24 illustrated by FIGS. 1 to 3 of the drawing, i.e., a bolt which threadably engages the inner finger 22, may be replaced with other means for producing the same results, such as an adjustable cam lever or similar device. Also the nut 30 of FIG. 2 may be recessed within a companion hexagonal recess in the rear surface of its finger 22 to provide locking engagement therewith.

Variations and modifications of the present invention will be apparent to those skilled in the art within the scope of the present claims.

I claim:

1. In an assembly comprising a handle element and a tool element which is frictionally-attached to said handle element so as to permit separation under the effect of an axial pulling force, the improvement which comprises a retainer means on one of said elements and a frictional engagement means on the other of said elements, and means for adjusting said frictional engagement means to increase or decrease the degree of frictional engagement with said retainer means and thereby vary the resistance of said elements to separate with respect to different predetermined axial pulling forces, said tool element comprising means for attaching a line thereto to permit control of said tool element upon separation from said handle element.

2. In an assembly comprising an elongate handle element having an axial bore and a tool element having a shank which is frictionally-engaged within said bore so as to permit separation under the effect of an axial pulling force, the improvement which comprises an adjustable tension release mechanism for increasing and decreasing the degree of frictional engagement between said tool element and said handle element, while still permitting separation during normal use, said mechanism comprising a transverse projection on one of said elements and a transverse recess for receiving said projection on the other of said elements, a longitudinal flexible finger designed to releasably press said transverse projection into said transverse recess when said elements are assembled, and adjustment means associated with said flexible finger for varying the degree of pressure between said projection and said recess to thereby adjust the degree of axial force required to pull said tool element out of engagement with said handle element while retaining the ability of said elements to separate under the effect of high axial pulling force.

3. An assembly according to claim 2 in which said recess is present on said handle element and said projection is present on said tool element.

4. An assembly according to claim 2 in which said transverse recess is present on said handle element within a longitudinal slot between a pair of fingers, said slot being designed to receive the transverse projection on said tool element, one of said fingers comprising said flexible finger, and said adjustment means controls the degree of flexibility of said flexible finger to vary the degree of frictional engagement between said recess and said projection.

5. An assembly according to claim 2 in which said transverse reeess is present on the shank of said tool element, and said projection is present on said handle element and comprises a transverse projection associated with said longitudinal flexible finger for releasable pressing said projection into said recess, and said adjustment means controls the degree of flexibility of said flexible finger to vary the degree of frictional engagement between said recess and said projection.

6. An assembly according to claim 5 in which said adjustment means comprises a collar which is threadably-engaged on said handle element for adjustment along the length of said flexible finger to control the degree of flexibility thereof.

7. An assembly according to claim 2 in which said adjustment means comprises indicia which permit said means to be adjusted to positions representative of predetermined degrees of frictional engagement.

8. An assembly according to claim 4 in which said adjustment means comprises a bolt which passes through said flexible finger and threadably-engages the other of said fingers to reduce or close said slot as said bolt is tightened.

9. An assembly according to claim 8 in which said bolt has a direction-indicating head and said flexible finger carries indicia which permit alignment with said head to provide a plurality of adjustment positions representative of a plurality of predetermined different degrees of frictional engagement corresponding to predetermined pulling forces.

10. An assembly according to claim 2 in which said tool element also comprises means for attaching a line thereto to permit control of said tool element upon separation from said handle element.

* * * * *